United States Patent [19]

Uraneck et al.

[11] 4,071,679

[45] Jan. 31, 1978

[54] EMULSION POLYMERIZED COPOLYMERS OF 2,4-PENTADIEN-1-OL

[75] Inventors: Carl A. Uraneck; John E. Burleigh; Paul W. Solomon, all of Bartlesville, Okla.

[73] Assignee: Phillips Petroleum Company, Bartlesville, Okla.

[21] Appl. No.: 625,746

[22] Filed: Oct. 24, 1975

[51] Int. Cl.$^2$ ............................................ C08F 236/14
[52] U.S. Cl. ............................ 526/338; 260/33.6 AQ
[58] Field of Search .......................................... 526/338

[56] References Cited

U.S. PATENT DOCUMENTS 3,041,320   6/1962   Chapin ................................. 526/338

OTHER PUBLICATIONS

Chemical Abstracts, vol. 81, No. 16702p, Ulbrich, 1974.
Chemical Abstracts, vol. 81, No. 38325v, Kopecek, 1974.
Woods & Lederle, Journal of the American Chemical Society, vol. 73, 1951, pp. 2245–2247.

Primary Examiner—Paul R. Michl

[57] ABSTRACT

Copolymers of 2,4-pentadien-1-ol with conjugated dienes, optionally with copolymerizable olefinically unsaturated monomers, are prepared by aqueous emulsion polymerization.

25 Claims, No Drawings

EMULSION POLYMERIZED COPOLYMERS OF 2,4-PENTADIEN-1-OL

FIELD OF THE INVENTION

The invention relates to rubbery copolymers of 2,4-pentadien-1-ol. The invention also relates to methods of preparation thereof by emulsion polymerization of 2,4-pentadien-1-ol with conjugated dienes, and optionally with other copolymerizable olefinically unsaturated monomers. In a further aspect, the invention relates to treadstock formulations.

BACKGROUND OF THE INVENTION

Rubbery polymers, such as polybutadiene or butadiene/styrene copolymers produced by emulsion polymerization methods are useful in many applications, particularly for tires. These polymers and copolymers are cured by conventional means such as sulfur curing.

It is desirable to produce rubbery polymers and copolymers that exhibit improved stress-strain and dynamic properties, making them even more suitable for tire applications. Further, if products with improved properties such as green tensile, swell resistance in solvents, skid indices, and the like, could be provided and at the same time provide improved curability, this indeed would be an achievement.

BRIEF SUMMARY OF THE INVENTION

We have discovered a new family of elastomers which are copolymers of 2,4-pentadien-1-ol with a conjugated diene, or with a conjugated diene and other copolymerizable olefinically unsaturated monomers, and methods of preparing the copolymers. These emulsion produced rubbery copolymers incorporating 2,4-pentadien-1-ol as a comonomer exhibit improved green tensile, maintaining good ozone resistance, with effective swell resistance to solvents, satisfactory skid indices. At the same time, these polymers containing hydroxy groups are indeed useful with a variety of curing methods to produce such as treadstock formulations.

In the past, other hydroxy containing copolymers have been employed in efforts to make polymers of this nature, notably, 2-hydroxymethyl-1,3-butadiene (isoprenol). However, despite the similarity in monomer between isoprenol and 2,4-pentadien-1-ol, yet unexpectedly and most surprisingly, the 2,4-pentadien-1-ol is much the better comonomer, resulting in much the better copolymers.

While we do not wish our invention to be bound or limited by theoretical considerations, it may be that certain structural differences are important. In copolymerizations, isoprenol would be expected to produce a variety of copolymerized skeletal structures as follows:

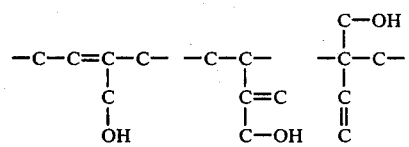

whereas the 2,4-pentadien-1-ol employed in the process of our invention would be expected to provide a slightly differing group of copolymerized units:

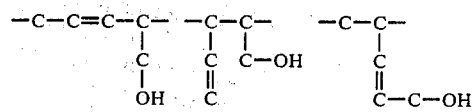

DETAILED DESCRIPTION OF THE INVENTION

According to our invention, 2,4-pentadien-1-ol is employed in an emulsion polymerization process in copolymerization with at least one conjugated diene, such as butadiene, or alternatively in a terpolymerization process with at least one conjugated diene and at least one copolymerizable olefinically unsaturated monomer, such as styrene, to produce a rubbery copolymer exhibiting a high degree of functionality attributable to the hydroxy groups provided by the 2,4-pentadien-1-ol, as well as a very satisfactory balance of properties including superior green tensile, good ozone resistance, desirable swell resistance to solvents, and satisfactory skid indices.

The 2,4-pentadien-1-ol monomer employed in our process has a structure:

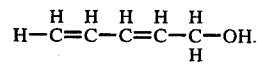

The polymers prepared incorporating the 2,4-pentadien-1-ol by emulsion polymerization can contain a broad working range of the 2,4-pentadien-1-ol, from 106:1 to 1:99 weight ratio of conjugated diene:2,4-pentadien-1-ol, though preferably for the reason of maintaining a highly elastomeric product we suggest a range of about 40:1 to 1:1. Where the terpolymers in accordance to our invention contain one or more other comonomers of a vinylidene group-containing type, the relationship of the conjugated diene: 2,4-pentadien-1-ol is maintained in the same molar ratios as just mentioned, plus the further addition of the copolymerizable olefinically unsaturated monomer in an amount up to about 60 percent by weight of total polymer.

MONOMERS

The 2,4-pentadien-1-ol monomer is used in copolymerization with one or more conjugated dienes. The conjugated dienes employed are those polymerizable with free radical polymerization initiators in emulsion polymerization systems. The conjugated dienes employed generally contain 4 to 12 carbon atoms per molecule, preferably for commercial availability 4 to 8 carbon atoms per molecule. Examples of such conjugated dienes include 1,3-butadiene, isoprene, chloroprene, piperylene, 2-methyl-1,3-pentadien, 2,3-dimethyl-1,3-butadiene, 1,3-octadiene, 5,6-diethyl-1,3-octadiene, phenyl butadiene, 1,3-hexadiene, and the like. The invention is not limited to the hydrocarbon conjugated dienes, since the emulsion polymerizable conjugated dienes can contain a variety of substituents, including the halogenated dienes, and the like. Of the conjugated dienes, presently preferred is butadiene because of cost, availability, convenience of handling, etc., with isoprene and piperylene also being especially suitable because of commercial availability.

Suitable copolymerizable monomers which optionally can be employed are the olefinically unsaturated compounds known to be copolymerizable in emulsion systems with the conjugated dienes. These further monomers include the monovinyl-substituted or propenyl-substituted aromatic compounds contain for convenience and availability in the range of 8 to 20 carbon atoms per molecule, more particularly for commercial availability and higher reactivity rates, 8 to 12 carbon atoms per molecule, including such as styrene, various of the alkylstyrenes, such as p-methylstyrene, as well as such as 1-propenylbenzene (beta-methylstyrene), the halostyrenes such as 2,3-dichlorostyrene, p-methoxystyrene, vinyl naphthalene and similar derivatives thereof, and the like. Other copolymerizable ethylenically unsaturated monomers include the ethylenically unsaturated nitriles of 3 to 8 carbon atoms per molecule, such as acrylonitrile or methacrylonitrile, various esters of acrylic or methacrylic acid of 3 to 8 carbon atoms per molecule, such as ethyl acrylate or methyl methacrylate, as well as vinyl esters of 3 to 8 carbon atoms per molecule, such as vinyl acetate, or other vinyl compounds such as the vinyl halides of 2 to 8 carbon atoms per molecule such as vinyl chloride, vinyl amides of 3 to 8 carbon atoms per molecule, and the like can be employed.

Our process thus is applied to 2,4-pentadien-1-ol, at least one conjugated diene, and optionally at least one other olefinically unsaturated monomer containing the

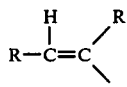

group wherein R is hydrogen or methyl. Styrene and acrylonitrile are especially well suited for employment in our invention, because of desirable reactivity and commercial availability.

POLYMERIZATION CONDITIONS

Polymerization conditions of temperature, time, pressure, and the like, can range widely, depending upon the particular materials and reactor conditions desired or convenient to employ, the monomers involved, relative volatility thereof, amounts of water, and other factors.

The process employed in preparing the copolymers of our invention is generally termed an emulsion process. The term "emulsion polymerization" as used herein is to be construed as polymerization under aqueous emulsion conditions in its boradest sense, that is, denoting the presence of an aqueous phase and an oil phase (monomer, optionally with diluent) without regard to the extent of dispersion one into the other, or of which is the continuous or discontinuous phase. Most usually, emulsion polymerization of the monomers described are carried out in aqueous dispersion, wherein the aqueous phase is the continuous phase, the monomers are dispersed therein, with the aid of such dispersing or emulsifying agents, and agitation, as necessary, as the discontinuous phase.

Emulsion polymerization is conducted by agitating the polymerization emulsion at polymerization temperatures exemplarily in the range of about −40° to +100° C., preferably about 0° to 50° C. The pH range can vary widely, such as about 1 to 12, though presently preferably about 7 to 10.8. Our experience has shown that these preferred conditions generally work together most effectively.

INITIATORS

Free radical initiators useful in the emulsion polymerization according to our invention include any of the broad groups of compounds utilized for the purpose in aqueous emulsion polymerization systems. Such initiators include the redox system such as ferrous sulfate/hydrogen peroxide, potassium persulfate/sodium bisulfite, and the like. Such free radical initiators also include the monomer-soluble, or sometimes termed oil-soluble, organoperoxides, organohydroperoxides, and azo compounds. Amounts of initiator employed are exemplarily in the range of about 0.01 to 5 phm (parts by weight per 100 parts by weight of total monomers, more preferred about 0.03 to 1 phm because it provides desirable conversion and polymer properties.

Exemplary catalyst include di-t-butylperoxide, benzoyl peroxide, lauroyl peroxide, t-butylperacetate, t-butyl perbenzoate, dicumyl peroxide, presently 2,5-dimethyl-2,5-di(t-butylperoxy)hexane, t-butyl hydroperoxide cumene hydroperoxide, p-menthane hydroperoxide, cyclopentane hydroperoxide, diisopropylbenzene hydroperoxide, p-t-butylcumene hydroperoxide, pinene hydroperoxide, 2,2'-azobis(2-methylpropionitrile), and the like, and mixtures thereof.

Generally incorporated in emulsion polymerization systems are molecular weight modifiers, particularly of the organo-sulfur type, including the dialkyl dixanthogens, diaryl disulfides, tetraalkylthiuram mono- and disulfides, mercaptothiazoles, and the like. the Most used commercially at present are the mercaptan compounds, and of these pesently are preferred the hydrocarbyl mercaptans containing 8 to 20 carbon atoms per molecule, with hydrocarbyl groups selected from alkyl, including primary, secondary, tertiary, cycloalkyl, cycloalkenyl, cycloalkadienyl, aryl, and combinations. Presently preferred are the mercaptan modifiers of the tertiary alkyl types.

The amount of organosulfur modifier employed can vary widely, as is known in the art, depending on particular compounds or mixtures chosen, as well as polymerization temperatures, emulsifier and other recipe factors and ingredients, and the extent of modification desired. Exemplary amounts are about 0.01 to 5 phm, parts of organosulfur compound per 100 parts total monomer by weight, with about 0.05 to 2 phm presently being preferred, because in combination with other polymerization parameters it produces desirable results.

Exemplary organosulfur modifiers include such as n-octyl mercaptan, n-dodecyl mercaptan, t-nonyl mercaptan, t-dodecyl mercaptan, t-hexadecyl mercaptan, t-octadecyl mercaptan, t-eicosyl mercaptan, sec-octyl mercaptan, sec-tridecyl mercaptan, cyclododecyl mercaptan, cyclododecadienyl mercaptan, aryl mercaptans such as 1-naphthalenethiol, and the like, bis(tetrahydrofurfural xanthogen), diphenyl disulfide, tetramethyl thiuram disulfide, 2-mercaptobenzothiazole, and the like. Mixtures or blends of any of these organosulfur compounds can also be used. Commercially available and suitable organosulfur compound modifiers often are mixtures of organosulfur compounds, e.g., mixtures of t-dodecyl, t-tetradecyl, and t-hexadecyl mercaptans.

EMULSIFYING AGENTS

A wide variety of emulsifying agents can be employed, including rosin acid soaps, disproportionated rosin acid soaps, fatty acid soaps, mixtures of disproportionated rosin acid soaps with fatty acid soaps, alkaryl sulfonates, and other surface-active materials and mixtures thereof. Nonionic emulsifiers also can be employed including polyethers and polyols.

Amounts of emulsifying agent employed depend on the type and reaction parameters and monomer concentrations. An expedient range would be about 0.5 to 10 phm, parts by weight per 100 parts of monomer. The relative amounts of emulsifier:modifier can range widely depending on monomers, species, reaction parameters, degree of modification desired, and the like. An expedient range would be about 250:1 to 1:1 weight ratio of emulsifier:modifier, although operability outside of this range is feasible.

Aqueous medium normally is employed with the emulsifier, though other components such as one or more of the lower alcohols or glycols may be added for lower temperature polymerizations when desired. The amount of water or water and alcohol or a glycol employed is a matter of convenience as to amounts of materials to handle and is not limiting as far as making the coagitated admixture of emulsifier:modifier is concerned. Supplemental water for the emulsion polymerization process itself can be readily later added at that stage.

It is generally preferred that the emulsion be of the oil in water type, employing a ratio of aqueous medium to monomeric material between about 0.15:1 and about 5:1, parts by weight.

After the degree of extent of polymerization desired has been accomplished, the polymerization reaction can be terminated with a shortstop. An antioxidant also usually is added to protect the polymer. The emulsion process results in a latex from which the polymer can be recovered by a process known as creaming, i.e., the addition of an aqueous salt solution such as sodium chloride solution, and coagulation of the polymeric product by the addition of a dilute mineral acid such as sulfuric acid. The product then is collected by filtration, washed, dried in conventional drying equipment.

EXAMPLES

Examples are provided to assist in an understanding of our invention and the scope thereof. Particular species employed in the examples, amounts, ratios, operating conditions, and the like, should be considered as exemplary and not limitative of the disclosed scope of our invention.

EXAMPLE I

A series of copolymers were made employing the comonomer 2,4-pentadien-1-ol according to our invention, preparing copolymers thereof with butadiene, or with butadiene and styrene, or with butadiene and acrylonitrile. In general, the emulsion polymerizations were conducted by preparing a soap solution of the fatty acid soap, potassium hydroxide, and water. In Run 1, thereafter were added in order 2,4-pentadien-1-ol, mercaptan, butadiene, and potassium persulfate. In Runs 2–7, inclusive, following the preparation of the soap solution, were added in order 2,4-pentadien-1-ol, styrene or acrylonitrile, mercaptan, a premixed solution of ethylenediamine tetraacetic acid-ferrous sulfate-sodium formaldehyde sulfoxylate in water, and finally p-menthane hydroperoxide.

After maintaining the respective emulsion polymerization system under a nitrogen atmosphere with agitation for the indicated time at the indicated polymerization temperature, the polymerization process was shortstopped with di-t-butyl hydroquinone or with sodium dimethyldithiocarbamate. A stabilizer was added, and the respective polymers were isolated as a product by creaming the aqueous system with aqueous sodium chloride, followed by coagulation with a dilute aqueous sulfuric acid (5 percent by weight). The product was washed with water. The product finally was dried under vacuum at 63° C.

For comparative purposes, prior art polymers, Runs 8 and 9 were prepared under conditions very similar to those employed for the polymers of our invention Runs 1–7, inclusive. These comparative polymers employed 2-hydroxymethyl butadiene in a copolymerization with butadiene. The recipe, polymerization conditions, and properties are shown in the respective comparative run columns 8 and 9. The order of addition for these comparative runs was the same as Example I above.

TABLE I

| Amounts indicated are parts by weight. Run No. | 1 | 2 | 3 | 4 | 5 | 6 | 7 | 8 | 9 |
|---|---|---|---|---|---|---|---|---|---|
| Recipe - Parts by Weight | | | | | | | | | |
| Butadiene | 70 | 95 | 60 | 65 | 67 | 68 | 60 | 70 | 70 |
| Styrene | | | 30 | 30 | 30 | 30 | | | |
| Acrylonitrile | | | | | | | 20 | | |
| 2,4-Pentadien-1-ol | 30 | 5 | 10 | 5 | 3 | 2 | 20 | | |
| 2-Hydroxymethyl-1,3-butadiene[a] | | | | | | | | 30 | 30 |
| Water | 191 | 180 | 190 | 178 | 176 | 192 | 187 | 190 | 200 |
| Fatty acid soap, potassium salt | 4.8 | 4.6 | 4.6 | 4.6 | 4.6 | 4.6 | 4.5 | 4.6 | 4.6 |
| Potassium hydroxide | 0.03 | 0.03 | 0.03 | 0.03 | 0.014 | 0.03 | 0.03 | 0.06 | 0.03 |
| tert-Dodecyl mercaptan | 0.22 | 0.21 | 0.20 | 0.18 | 0.22 | 0.23 | 0.20 | 0.54 | 0.54 |
| Ethylene diamine tetraacetic acid | | 0.08 | 0.144 | 0.112 | 0.064 | 0.064 | 0.080 | | |
| Ferrous sulfate heptahydrate | | 0.02 | 0.04 | 0.03 | 0.015 | 0.015 | 0.02 | | |
| Sodium formaldehyde sulfoxylate | | 0.1 | 0.2 | 0.15 | 0.075 | 0.085 | 0.1 | | |
| Daxad 17[b] | | 0.2 | 0.2 | 0.2 | 0.2 | 0.2 | 0.2 | | |
| Potassium chloride | | 0.3 | 0.3 | 0.3 | 0.3 | 0.3 | 0.3 | | |
| Potassium persulfate | 0.6 | | | | | | | 0.6 | 0.6 |
| p-Menthane hydroperoxide | | 0.125 | 0.253 | 0.19 | 0.095 | 0.095 | 0.125 | | |
| Polymerization Temp., ° C | 50 | 5 | 5 | 5 | 5 | 5 | 5 | 50 | 50 |
| Polymerization time, hr. | 27.5 | 8.6 | 4.5 | 6.4 | 7.2 | 5.5 | 10 | 14.4 | 14.9 |
| Di-t-butyl hydroquinone | 0.8 | | | | | | 1 | 0.2 | 1 |
| Flexzone 7L[c] phr[d] | 0.8 | 1 | 1 | 1 | 1 | 1 | 1 | 1 | 1 |
| Sodium dimethyldithiocarbamate | | 0.32 | 0.5 | 0.48 | 0.24 | 0.2 | | | |

TABLE I-continued

Amounts indicated are parts by weight.

| Run No. | 1 | 2 | 3 | 4 | 5 | 6 | 7 | 8 | 9 |
|---|---|---|---|---|---|---|---|---|---|
| Conv., % | 59 | 61 | 60 | 62 | 60 | 64 | 64 | 76 | 77 |

(a)isoprenol.
(b)Daxad 17: Sodium salts of polymerized alkyl naphthalene sulfonic acids.
(c)Flexzone 7L: N-1,3-dimethylbutyl-N'-phenyl-p-phenylenediamine.
(d)phr: parts per 100 parts rubber by weight.

Raw data for the polymers obtained in the several emulsion polymerizations are shown in Table II:

TABLE II

| Run No. | Raw Mooney, ML-4 | Inh. Vis. | Gel, % | Refractive Index at 25° C |
|---|---|---|---|---|
| 1 | 46 | 2.19 | Tr. | 1.5212 |
| 2 | — | 2.76 | 1 | 1.5138 |
| 3 | 35 | — | — | 1.5392 |
| 4 | 47 | — | — | — |
| 5 | 40 | 1.89 | 0 | — |
| 6 | 47.5 | — | — | — |
| 7 | — | 0.55 | 7 | 1.5190 |
| 8 | 27.5 | 1.70 | 0 | 1.5240 |
| 9 | 43.5 | 1.76 | 0 | 1.5240 |

Polymers prepared in accordance with the above recipe then were employed in tire tread stock formulations, and evaluated as tread stocks. The following treadstock formula was employed.

| | Tread Recipe Parts by Weight |
|---|---|
| Polymer | 100 |
| Carbon black[a] | 50 |
| Oil[b] | 10 |
| Zinc oxide | 3 |
| Stearic acid | 2 |
| Flexamine G[c] | 1 |
| Sulfur | 1.75 |
| Accelerator[d] | Variable |

[a]IRB# 3 - High abrasion furnace black.
[b]Philrich 5 - aromatic oil.
[c]Mixture of diarylamine - ketone reaction product - 65% and N,N'-diphenyl-p-phenylene diamine - 35%.
[d]N-t-butyl-2-benzothiosolesulfenamide.

The above tread stock formulations were cured at 150° C. for thirty minutes. Evaluations of the resultant series of tread stocks is shown in Table III:

TABLE III

| Run No. | 10 | 11 | 12 | 13 | 14 |
|---|---|---|---|---|---|
| Polymer (Run No.) | 1 | 3 | 6 | 8 | |
| Butadiene | 70 | 60 | 68 | 70 | 70 |
| Styrene | | 30 | 30 | | 30 |
| 2,4-Pentadien-1-ol | 30 | 10 | 2 | | |
| 2-Hydroxymethyl butadiene | | | | 30 | |
| Accelerator | 0.6 | 0.9 | 1.2 | 0.6 | 1.2 |
| Monsanto Rheometer[h] | | | | | |
| Max. visc., in-lbs | 33.8 | 30.0 | 33.6 | 23.7 | 31.0 |
| Min. visc., in-lbs | 5.1 | 5.3 | 7.5 | 7.3 | 6.7 |
| Scorch (4 in-lbs), min. | 2.6 | 5.8 | 6.0 | 5.7 | 6.1 |
| Cure rate, in-lbs/min. | 7.6 | 4.0 | 3.9 | 2.7 | 3.0 |
| 95% Cure, min. | 16.0 | 18.0 | 18.6 | 18.0 | 21.3 |
| Reversion, (1 in-lb), min. | none | none | none | none | none |
| Compression set,%[a] | 12.4 | 15 | 12 | 17.2 | 12.7 |
| 300% Modulus, psi[b] | 2090 | 2050 | 1920 | 1390 | 1820 |
| Tensile, psi[b] | 3150 | 3450 | 3500 | 2425 | 3850 |
| Elongation, %[b] | 400 | 480 | 480 | 420 | 530 |
| ΔT, °F[c] | 60.9 | 73 | 65 | 89.8 | 66.5 |
| Resilience, %[d] | 60.2 | 57 | 61 | 50.8 | 60.7 |
| Shore A hardness[e] | 60.5 | 63 | 63 | 60 | 62 |
| Gehman freeze point, °C[f] | −52 | −43 | −47 | −42 | −48 |
| Portable skid test, rating[g] | 96 | 116.8 | 120.8 | 106 | 105.2 |

[a]ASTM D-395-61, Method B (modified)
[b]ASTM D-412-66.
[c]ASTM D-623-62, Method A.
[d]ASTM D-945-59 (modified).
[e]ASTM D-2240-68.
[f]ASTM D-1053-61 (modified).
[g]Data obtained using Portable Skid Resistance Tester employing Syenite glass (Bevilacqua and Percarpio, Science 160, 959–964 (1968).
[h]ASTM D-2705-68T.

The data above illustrate the vulcanizate properties obtained from polymers of this invention. In particular a comparison is given between a vulcanizate of an inventive butadiene/2,4-pentadien-1-ol copolymer Run 10 and that of a prior art butadiene/2-hydroxymethyl butadiene copolymer Run 13. The combination of lower compression set and higher modulus for the inventive vulcanizate of Run 10 is indicative of a higher cure rate for the inventive polymer compared to the prior art polymer. The higher tensile, lower heat buildup, higher resilience and lower Gehman freeze point of the inventive vulcanizate compared to the prior art vulcanizate are more desirable properties for tread stocks.

Run 14 employed a prior art polymer containing 70/30 weight ratio of butadiene/styrene prepared generally as described in Example I without 2,4-pentadien-1-ol. A comparison of Inventive Run 12 with run 14 showed a higher cure rate, higher modulus, lower elongation, better skid resistance and lower heat buildup for the inventive polymer containing only 2 weight percent 2,4-pentadien-1-ol. A comparison of Inventive Run 11 with Comparative Run 14 showed a higher cure rate, higher modulus, lower elongation and better skid resistance for the inventive polymer containing 10 weight percent 2,4-pentadien-1-ol.

EXAMPLE II

Inventive Run 15 illustrates the vulcanization is a tread stock formulation of a butadiene/acrylonitrile/2,4-pentadien-1-ol terpolymer (60/20/20 weight ratio) prepared in Run 7. Formulation recipe was as given and evaluation results of stock vulcanized at 153° C for 20 minutes are given in Table IV.

| RECIPE | |
|---|---|
| | Parts by Weight |
| Polymer | 100 |
| Carbon black[a] | 40 |
| Carbon black[b] | 25 |
| Zinc oxide | 5 |
| Stearic acid | 2 |
| Antioxidant[c] | 1.5 |
| Dibutyl sebacate | 7.5 |
| Phthalic anhydride | 0.5 |
| Sulfur | 0.5 |
| Benzothiazyl disulfide | 1.6 |
| Tetramethylthiuram disulfide | 2.8 |

[a]Medium thermal furnace black (N 990).
[b]Channel black (Indotex EPC).
[c]Diphenylamine-acetone reaction product (Uniroyal).

TABLE IV

| Monsanto Rheometer | |
|---|---|
| Max. visc., in-lbs | 49.4 |
| Min. vsic., in-lbs | 3.6 |
| Scorch (4 in-lbs), min. | 2.4 |
| Cure rate, in-lbs/min. | 2.5 |
| 95% Cure, min. | 47.3 |
| Reversion, (1 in-lb), min. | None |
| Compression set, % | 17.5 |
| Tensile, psi | 1775 |
| Elongation | 190 |
| Shore A hardness | 70 |
| Gehman freeze point | −22 |

The above data are illustrative of some of the properties of vulcanizates based on butadiene/acrylonitrile/2,4-pentadien-1-ol terpolymers.

The disclosure, including data, illustrate the value and effectiveness of our invention. The examples, the knowledge and background of the field of the invention and general principles of chemistry and other applicable sciences have formed the bases from which the broad descriptions of the invention including the ranges of conditions and generic groups of operant components have been developed, which have formed the bases for our claims here appended.

We claim:

1. Copolymers of 2,4-pentadiene-1-ol with a conjugated diene, optionally with a further olefinically unsaturated comonomer, wherein said 2,4-pentadiene-1-ol represents a ratio of about 50:50 to 75:25 weight percent said conjugated diene:2,4-pentadiene-1-ol.

2. The 2,4-pentadien-1-ol copolymers according to claim 1 wherein said conjugated diene comonomer contains 4 to 12 carbon atoms per molecule.

3. The 2,4-pentadien-1-ol comonomers according to claim 2 wherein said conjugated diene comonomer is selected from the group consisting of 1,3-butadiene, isoprene, chloroprene, piperylene, 2-methyl-1,3-pentadiene, 2,3-dimethyl-1,3-butadiene, 1,3-octadiene, 5,6-diethyl-1,3-octadiene, phenyl butadiene, and 1,3-hexadiene.

4. The 2,4-pentadien-1-ol comonomers according to claim 1 incorporating both said conjugated diene and said further olefinically unsaturated comonomer as comonomers, and wherein said copolymerizable olefinically unsaturated comonomer represents up to about 60 weight percent of total monomers.

5. The 2,4-pentadien-1-ol comonomers according to claim 4 wherein said further olefinically unsaturated monomer is a monovinyl-substituted aromatic compound of 8 to 20 carbon atoms per molecule, monopropenyl-substituted aromatic compound of 8 to 20 carbon atoms per molecule, ethylenically unsaturated nitrile of 3 to 8 carbon atoms per molecule, ester of acrylic or methacrylic acid of 3 to 8 carbon atoms per molecule, vinyl ester of 3 to 8 carbon atoms per molecule, vinyl halide of 2 to 8 carbon atoms per molecule, or vinyl amide of 3 to 8 carbon atoms per molecule.

6. The 2,4-pentadien-1-ol comonomers according to claim 3 wherein said conjugated diene is 1,3-butadiene, and wherein said weight ratio is in the range of about 70:30.

7. The 2,4-pentadien-1-ol copolymers according to claim 4 wherein said copolymerizable olefinically unsaturated comonomer is represented in the amount of up to about 40 percent by weight of the total of said polymer.

8. The 2,4-pentadien-1-ol copolymers according to claim 7, wherein said conjugated diene is butadiene, said further olefinically unsaturated comonomer is styrene, and wherein said styrene represents about 30 parts by weight of total copolymerized comonomers.

9. The 2,4-pentadien-1-ol copolymers according to claim 4 wherein said conjugated diene is butadiene, said copolymerizable olefinically unsaturated monomer is acrylonitrile, and said ratio of 2,4-pentadien-1-ol:butadiene:acrylonitrile, expressed in parts by weight, is about 20:60:20.

10. A process for preparing copolymers of 2,4-pentadien-1-ol with at least one conjugated diene, and optionally with at least one further olefinically unsaturated monomer, as defined by claim 1, which comprises:
admixing water, emulsifier, modifier, 2,4-pentadien-1-ol monomer, at least one conjugated diene, and optionally at least one further copolymerizable olefinically unsaturated monomer, with a free radical initiator and polymerizing the resulting polymerization admixture under aqueous emulsion polymerization conditions.

11. The process according to claim 10 wherein when said optional copolymerizable olefinically unsaturated comonomer is employed, said olefinically unsaturated comonomer is employed in the range of up to about 60 weight percent relative to total monomers.

12. The process according to claim 11 wherein said conjugated diene contains 4 to 12 carbon atoms per molecule, and is selected from the group consisting of 1,3-butadiene, isoprene, chloroprene, piperylene, 2-methyl-1,3-pentadiene, 2,3-dimethyl-1,3-butadiene, 1,3-octadiene, 5,6-diethyl-1,3-octadiene, phenyl butadiene, and 1,3-hexadiene.

13. The process according to claim 11 wherein said process employs said further olefinically unsaturated monomer, and wherein said further olefinically unsaturated monomer is a monovinyl substituted aromatic compound of 8 to 12 carbon atoms per molecule, monopropenyl substituted aromatic compound of 8 to 12 carbon atoms per molecule, vinyl nitrile, ester of acrylic or methacrylic acid, vinyl ester, vinyl halide, vinyl amide, or vinyl ether.

14. The process according to claim 13 wherein said emulsifier is an anionic or nonionic emulsifier, which is a rosin acid soap, disproportionated rosin acid soap, fatty acid soap, alkaryl sulfonate, or a mixture, and wherein said emulsifying agent is employed in a range of about 0.5 to 10 phm, parts by weight per 100 parts of monomer.

15. The process according to claim 14 wherein said modifier is an organic sulfur compound selected from the group consisting of mercaptans, dialkyl dixanthogens, diaryl disulfides, tetraalkylthiuram mono- or disulfides, or mercaptothiazoles, employed in an amount sufficient to provide about 0.01 to 5 phm of modifier.

16. The process according to claim 15 wherein said modifier is selected from the group consisting of n-octyl mercaptan, n-dodecyl mercaptan, t-nonyl mercaptan, t-dodecyl mercaptan, t-hexadecyl mercaptan, t-octadecyl mercaptan, t-eicosyl mercaptan, sec-octyl mercaptan, sec-tridecyl mercaptan, cyclododecyl mercaptan, cyclododecadienyl mercaptan, aryl mercaptans such as 1-naphthalenethiol, and the like, bis(tetrahydrofurfural xanthogen), diphenyl disulfide, tetramethyl thiuram disulfide, and 2-mercaptobenzothiazole.

17. The process according to claim 15 wherein said free radical initiator is a redox initiator, oil soluble organoperoxide, oil soluble organohydroperoxide, or azo compound, employed in an amount sufficient to provide about 0.01 to 5 phm.

18. The process according to claim 17 wherein said emulsion polymerization is conducted at a temperature in the range of about −40° C. to +100° C., at a pH in the range of about 7 to 10.8, and for a time and at a pressure effective for said polymerization.

19. The process according to claim 18 wherein said conjugated diene is butadiene.

20. The process according to claim 19 employing butadiene and styrene as comonomers with said 2,4-pentadien-1-ol.

21. The process according to claim 19 employing butadiene and acrylonitrile as comonomers in polymerization with said 2,4-pentadien-1-ol.

22. The process according to claim 19 employing monomers in weight ratios of about 70:30 butadiene:2,4-pentadien-1-ol.

23. The process according to claim 21 employing butadiene:acrylonitrile:2,4-pentadien-1-ol in a weight ratio of about 60:20:20.

24. A thread stock formulation employing the copolymer as defined by claim 1.

25. A cured tread stock formulation according to claim 24.

* * * * *